Feb. 4, 1958 H. S. DALEY 2,821,851
SYSTEM FOR HYDROSTATICALLY TESTING CONTAINERS
Filed Aug. 5, 1954 2 Sheets-Sheet 1

INVENTOR
Horace S. Daley
BY
ATTORNEY

Feb. 4, 1958 — H. S. DALEY — 2,821,851
SYSTEM FOR HYDROSTATICALLY TESTING CONTAINERS
Filed Aug. 5, 1954 — 2 Sheets-Sheet 2
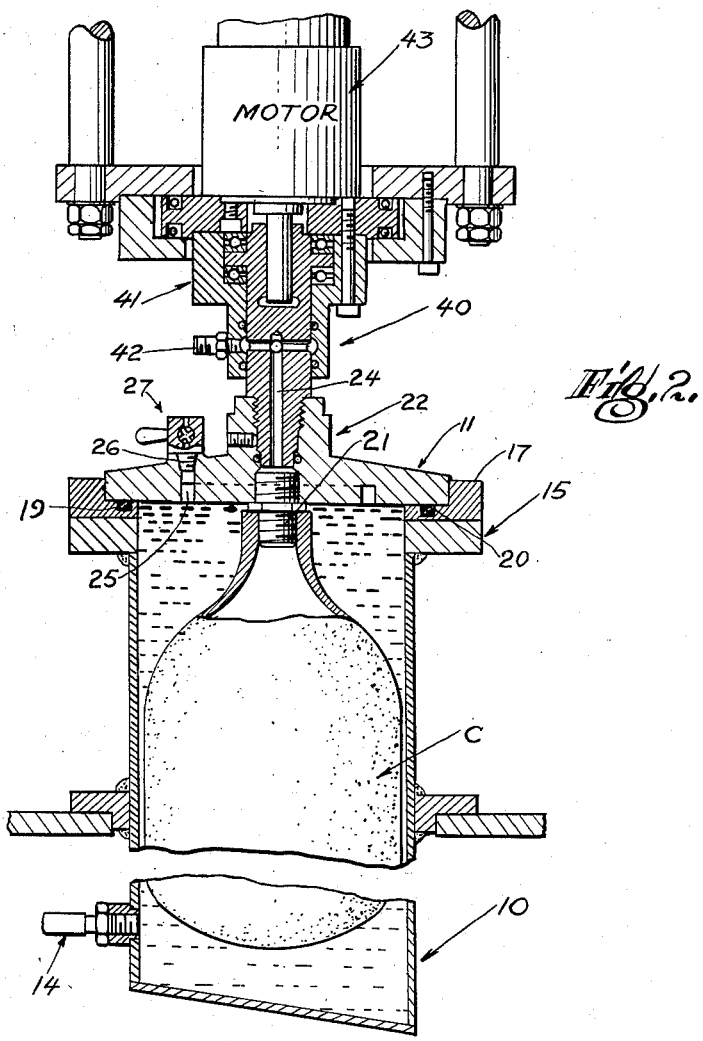
INVENTOR
Horace S. Daley
BY
Ernest [signature]
ATTORNEY

2,821,851

SYSTEM FOR HYDROSTATICALLY TESTING CONTAINERS

Horace S. Daley, Clifton, N. J., assignor to Specialties Development Corporation, Belleville, N. J., a corporation of New Jersey Application August 5, 1954, Serial No. 448,035

7 Claims. (Cl. 73—37)

The present invention relates to measuring and testing, and, more particularly, to an improved system for hydrostatically testing containers adapted for storing pressure medium therein.

Heretofore, the prescribed and most widely recognized procedure of hydrostatically testing such containers (to determine whether or not they are in condition to safely withstand the working pressure of the medium to be stored therein) has been carried out in connection with apparatus comprising a jacket having a water inlet, a domed cover for the jacket having centrally located means for suspending a container therefrom and introducing test fluid therein and having a valved overflow outlet adjacent the container suspending means, clamping means for releasably securing the cover to the jacket, a volumetric measuring device such as a burette, a tube connecting the lower end of the burette to the jacket, and a valve drainage outlet in the tube.

The procedure followed in utilizing the foregoing apparatus comprised partially filling the uncovered jacket with water, filling the container with water, attaching the container to the cover, clamping the cover on the jacket, introducing water into the jacket with the overflow outlet valve open until water spouted therefrom, closing the overflow outlet valve whereby water entered the burette, closing the jacket water inlet valve, and opening the burette drainage valve until the water therein was brought to zero level. A test fluid, such as water under high pressure, was then introduced into the container to completely fill and slightly expand the same and thereby force some of the water by displacement from the jacket into the burette, and such expansion was noted by observing the new level of the water in the burette. The rise in water level indicated whether or not the container had been expanded beyond a safe value, such extent of expansion reflecting the safe or unsafe condition of the container. Thereafter, the test fluid supply was bled off, the overflow outlet valve was opened to vent the jacket, the cover was unclamped and removed, and the container was detached from the cover to conclude a test cycle.

In addition to requiring numerous manually performed and time consuming manipulative operations, the foregoing test procedure had the disadvantage of being messy in that considerable quantities of water were spilled in the vicinity of the jacket thereby compelling the operator to wear boots and other waterproof apparel in order to remain dry and comfortable, and had the disadvantage of air being entrapped in the test circuit which resulted in inaccurate test data and required the employment of a highly skillful operator to eliminate as much human error as possible. Consequently, the care exercised by such an operator prolonged the time consumed in performing the tests.

Accordingly, an object of the present invention is to provide a system for hydrostatically testing containers which is not subject to the foregoing difficulties and disadvantages.

Another object is to provide such a system which can be utilized to give accurate and reliable results with a minimum of skill and in a much shorter period of time than heretofore required.

Another object is to greatly reduce the number of manipulative steps heretofore required.

Another object is to provide such apparatus wherein entrapment of air in the jacket and the burette line is prevented.

Another object is to provide such apparatus wherein very little water is spilled.

Another object is to provide such apparatus wherein the water in the burette may be brought to a zero level in a simple and expeditious manner.

A further object is to provide such a system which lends itself to completely manual, semi-automatic or completely automatic operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

Fig. 2 is an enlarged fragmentary sectional view, illustrating the jacket closing arrangement in detail.

Fig. 3 is a fragmentary sectional view, illustrating a slightly different arrangement for closing the jacket.

Figure 1:
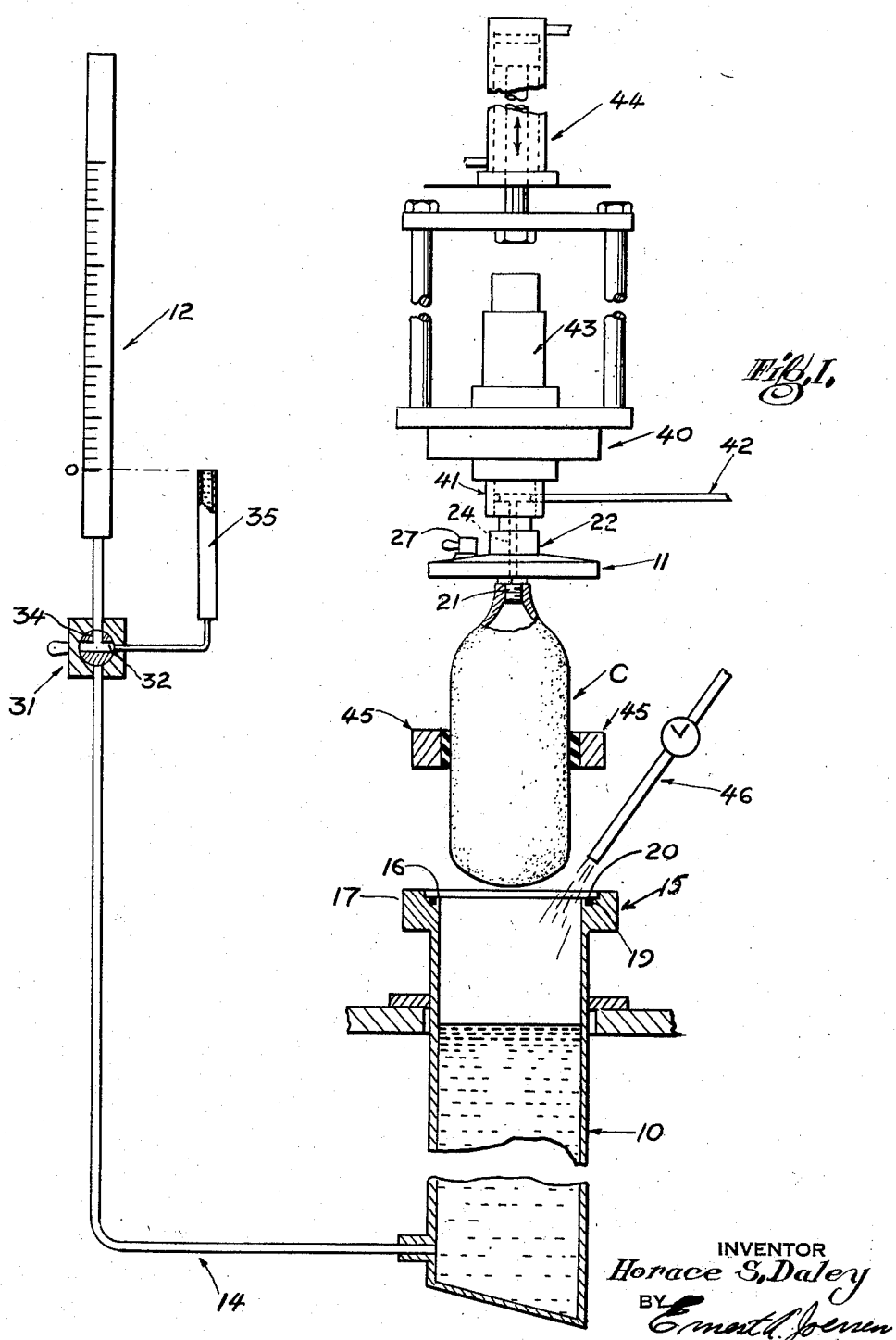
Fig. 1 is a generally schematic view of a system in accordance with the present invention, illustrating apparatus partly in elevation and partly in section.

Referring to the drawings in detail and more particularly to Fig. 1 thereof, there is shown a system for hydrostatically testing containers which generally comprises a jacket 10 adapted to be filled with water and having an open upper end, a cover 11 for sealing the open end of the jacket having means on the underside thereof for attaching and suspending a container C in the jacket and having means for introducing test fluid into the container, volumetric measuring means such as a burette 12, and a conduit 14 establishing a fluid flow connection between the jacket and the lower end of the burette.

The cover 11 is constructed and arranged to extend within the jacket opening and displace a small volume of water therefrom, either by way of the conduit 14 or by overflowing the rim of the jacket, whereby, when the jacket is practically filled with water while the container is inserted therein, the entire underside of the cover is adapted to be brought into direct contact with the water in the jacket to prevent the entrapment of air under the cover and thereby assuring that the jacket is completely filled with water.

As shown in Fig. 2, the foregoing may be accomplished by providing a ring 15 at the open end of the jacket which includes an annular seat section 16 and an annular wall section 17 surrounding the seat section for determining the water level within the jacket and for receiving the lower portion of the cover 11. In order to seal the jacket when the cover is applied, the seat section 16 is formed with an annular groove 19 in which a suitable compressible gasket such as an O-ring 20 is positioned. The underside of the cover is substantially flat to facilitate seating its outer peripherial zone on the seat section 16, and, in any event, extends completely below such water level which may be established within the wall section 17, whereby displacement of excess water is effected without the entrapment of air.

The cover 11 also is provided with a centrally located screw threaded nipple 21 for detachably securing the neck of the container therein, this arrangement constituting the container attaching means previously mentioned herein. The top side of the cover is formed with a central boss 22 having a bore 24 therein which communicates with the threaded nipple 21 and is adapted for connecting a source of test fluid thereto.

The cover 11 further is provided with vacuum breaking means to facilitatae lifting the cover upon removal thereof from the jacket at the completion of the test. Such means may be an annular groove 25 at the underside of the cover which is adapted to trap a small quantity of air and compress the same as the cover is seated. This air expands upon raising the cover to counteract any vacuum effect acting to resist removal of the cover. Since, the quantity of air entrapped is uniform in each instance, is relatively small, cannot change its level and cannot get into the water filling the jacket, this air is not objectionable and does not interfere with the accuracy of the tests.

If desired, the groove 25 may be replaced or supplemented by a vent passage 26 extending to the underside of the cover or within the groove which is normally closed by a valve 27.

In Fig. 3, another arrangement is shown for effecting complete filling of the jacket without entrapment of air upon applying the cover. In this arrangement, the ring 15 is dispensed with and the cover fits into the upper end of the jacket. A gasket 29 carried by the cover on its outer periphery effects sealing of the jacket to cause excess water in the jacket to be displaced primarily by way of the conduit 14 leading to the burette. If desired, a shoulder 30 may be provided within the upper end of the jacket, below its rim, for limiting the distance the cover can move into the jacket.

It will be noted that the cover applying arrangements illustrated in Figs. 2 and 3 eliminate the necessity of clamping down the cover because the weight of the cover is sufficient to resist lifting thereof by water being displaced within the jacket during the testing of the container.

In order to adjust the water in the burette to a zero level, a valve 31 is connected in the conduit 14 comprising a drainage outlet 32 and a valve member 34 which has passageway means constructed and arranged to alternately establish flow communication between the burette and the jacket or the outlet 32. Such a valve enables the water displaced from the jacket in the closing thereof to enter the burette and then being drained off to the zero level.

An even more advantageous valve arrangement, as shown in Fig. 1, further includes passageway means for simultaneously establishing communication between the burette, the jacket and the drainage outlet, to provide in effect a three-way valve. Such a valve can be used to best advantage in conjunction with a device for automatically establishing the zero level, for example, a tube 35 having an open upper end in horizontal alignment with the zero mark on the burette and having its lower end in flow communication with the drainage outlet 32. It will of course be understood that the zero level drain tube 35 could also be utilized to good advantage in connection with the first mentioned valve arrangement having only two operative positions.

The apparatus has been described so far with respect to the elements providing a manually operated system. However, the apparatus shown in Fig. 1 (with the cover of either Fig. 2 or Fig. 3) is also adapted for automatic or semi-automatic operation. This is accomplished by providing a head 40 including a shaft threaded into the collar 22 and formed with the bore 24 and having cross-bores for supporting the cover 11 above the jacket 10 and including a fitting 41 within which the shaft rotates for connecting the nipple 21 with a water hose 42 through the bore and cross-bores; a motor 43 operable to rotate the shaft in either direction; a piston and cylinder mechanism 44 for raising and lowering the head; and means 45 for clamping the container when supported above the jacket while the motor is operating to respectively attach and detach the cover and the container. In such apparatus, the piston and cylinder mechanism constitutes a ram for urging the cover against its seat (Fig. 2) to seal the jacket.

Although not shown, it will be apparent that suitable mechanism is provided for moving the means 45 in clamping position and out of such position to prevent the same from interfering with the head as it is raised and lowered. Also, it will be apparent that the foregoing apparatus, the burette valve and the means 46 for replenishing water in the jacket could be under the control of mechanism for automatically carrying out the operating cycle thereof.

The apparatus in accordance with the present invention is utilized by providing a quantity of water in the jacket, the volume of which may be predetermined, whereby, when the container is confined in the jacket, the jacket is substantially filled; confining the container in the jacket and inserting the closure into the jacket to cause water to be displaced from the jacket and enter the burette and establish a water level therein; and introducing test fluid into the container to expand the same and cause water to be displaced from the jacket and enter the burette and establish a higher water level therein, whereby the rise in water level indicates the extent of expansion of the container. Preferably, before introducing the test fluid into the container, water is drained from the burette to adjust the level to zero, whereby a numerical higher level in each instance upon expansion of the container indicates the extent of expansion without calculating the difference in water levels arithmetically.

After the second water level has been noted, the valve 31 is positioned to shut off communication between the jacket line 14 and the burette and to establish communication between the burette and the drain. The supply of test fluid for the container is then disconnected and the test fluid supply line is vented. The container is then withdrawn from jacket and is removed from the closure, and make-up water is supplied to the jacket by the means 46. During these operations, the water level in the line 14 normally would seek that of the water level in the jacket and cause air to be introduced into the upper end of the line 14. However, this is prevented by shutting off the upper end of the line by positioning the valve as just described.

In testing the next container, the valve is maintained in the aforementioned position until the closure has been seated to seal the jacket with the container therein, and is then positioned to establish communication between the jacket line and the burette and the drain. Finally, the valve is positioned to establish communication between only the burette and the jacket line, and, thereby condition the apparatus for testing the container.

From the foregoing description it will be seen that the present invention provides simple, practical and reliable system for hydrostatically testing containers of the type adapted to store fluid under pressure.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a system for hydrostatically testing containers adapted for storing pressure medium therein, the combination of a jacket adapted to be filled with water having an open upper end including a seat and a wall surrounding said seat, volumetric measuring means, conduit means for establishing a fluid flow connection between said jacket and said measuring means, and a cover positioned on said seat to seal said open end having means on the underside thereof for suspending a container to be tested in said jacket and having means for introducing test fluid into the container, said cover fitting into said wall to displace water from said jacket above said seat and having a recess on the underside thereof above the level of said seat for trapping a small quantity of air and to compress the same as the cover is positioned on said seat.

2. In a system for hydrostatically testing containers adapted for storing pressure medium therein, the combination of a jacket adapted to be filled with water having an open upper end, volumetric measuring means having a reference level mark, a conduit for establishing a fluid flow connection between said jacket and the lower end of said measuring means having a drainage outlet located above the water level of said jacket and at the level of said reference mark, a valve for said outlet, and a cover for sealing said open end having means on the underside thereof for suspending a container to be tested in said jacket and having means for introducing test fluid into the container, said cover being constructed and arranged to extend within said opening and displace water from said jacket to raise the water level of said measuring means.

3. A system according to claim 2, wherein said valve is a three-way valve for selectively connecting said measuring means with said outlet while disconnecting said measuring means and said jacket, connecting said measuring means with said outlet and said jacket, and connecting said measuring means with said jacket while closing said outlet.

4. A system according to claim 2, wherein said measuring means is a burette having a zero mark and said valve is operable to adjust the water level in said burette to the zero mark thereof.

5. A system according to claim 4, wherein an overflow tube is connected to said drainage outlet having an opening in horizontal alignment with the zero mark of said burette.

6. In a system for hydrostatically testing containers adapted for storing pressure medium therein, the combination of a jacket adapted to be filled with water having an open upper end, a burette, conduit means for establishing a fluid flow connection between said jacket and the lower end of said burette having a drainage outlet, an overflow tube connected to said outlet having an opening in horizontal alignment with the zero mark of said burette and above the water level of said jacket, a valve for controlling said outlet, and a cover cooperating with said open end to seal said jacket, said cover having means on the underside thereof for supporting a container to be tested in said jacket and having means for introducing test fluid into the container.

7. A system according to claim 6, wherein said valve is a three-way valve for selectively connecting said burette with said outlet while disconnecting said burette and said jacket, connecting said burette with said outlet and said jacket, and connecting said burette with said jacket while closing said outlet.

References Cited in the file of this patent

UNITED STATES PATENTS

| | | |
|---|---|---|
| 1,776,524 | Sturcke | Sept. 23, 1930 |
| 1,783,412 | Crowe | Dec. 2, 1930 |
| 1,796,489 | Sturcke | Mar. 17, 1931 |
| 2,293,471 | Protin | Aug. 18, 1942 |
| 2,391,351 | Schmidt | Dec. 18, 1945 |
| 2,668,437 | Patch | Feb. 9, 1954 |

FOREIGN PATENTS

| | | |
|---|---|---|
| 7,914 | Great Britain | A. D. 1894 |
| 415,352 | France | Sept. 24, 1910 |